(12) United States Patent
Coley et al.

(10) Patent No.: US 7,607,166 B2
(45) Date of Patent: Oct. 20, 2009

(54) SECURE MANUFACTURING DEVICES IN A SWITCHED ETHERNET NETWORK

(75) Inventors: Kenneth Coley, Campbell, CA (US); Pauline Shuen, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 777 days.

(21) Appl. No.: 10/890,500

(22) Filed: Jul. 12, 2004

(65) Prior Publication Data

US 2006/0010318 A1  Jan. 12, 2006

(51) Int. Cl.
*G06F 7/04* (2006.01)
(52) U.S. Cl. .............................. 726/3; 726/12; 713/150; 380/255; 709/230; 709/238
(58) Field of Classification Search ................. 713/150, 713/153, 160; 726/11, 13, 22, 3, 12, 14, 726/15; 380/255
See application file for complete search history.

(56) References Cited

U.S. PATENT DOCUMENTS

| | | | | |
|---|---|---|---|---|
| 5,604,914 | A * | 2/1997 | Kabe ............................. | 710/1 |
| 6,704,874 | B1 * | 3/2004 | Porras et al. ................... | 726/22 |
| 6,775,283 | B1 * | 8/2004 | Williams ....................... | 370/392 |
| 7,028,204 | B2 * | 4/2006 | Jammes et al. ............... | 713/400 |
| 7,136,351 | B2 * | 11/2006 | Metin et al. .................. | 370/230 |
| 7,283,525 | B2 * | 10/2007 | Burgess et al. ............... | 370/392 |
| 7,327,693 | B1 * | 2/2008 | Rivers et al. ................. | 370/252 |
| 7,391,719 | B2 * | 6/2008 | Ellis et al. ..................... | 370/219 |
| 2001/0012296 | A1 * | 8/2001 | Burgess et al. ............... | 370/392 |
| 2002/0010869 | A1 * | 1/2002 | Kim ............................. | 713/201 |
| 2002/0031142 | A1 * | 3/2002 | Metin et al. .................. | 370/463 |
| 2002/0073338 | A1 * | 6/2002 | Burrows et al. .............. | 713/201 |
| 2002/0112076 | A1 * | 8/2002 | Rueda et al. ................. | 709/245 |
| 2002/0163920 | A1 * | 11/2002 | Walker et al. ................ | 370/401 |
| 2002/0169844 | A1 * | 11/2002 | Jammes et al. ............... | 709/207 |
| 2003/0172145 | A1 * | 9/2003 | Nguyen ....................... | 709/223 |
| 2004/0064380 | A1 * | 4/2004 | Hiratsuka ..................... | 705/27 |
| 2004/0107345 | A1 * | 6/2004 | Brandt et al. ................. | 713/171 |
| 2004/0117624 | A1 * | 6/2004 | Brandt et al. ................. | 713/166 |
| 2004/0143734 | A1 * | 7/2004 | Buer et al. .................... | 713/153 |
| 2004/0162996 | A1 * | 8/2004 | Wallace et al. ............... | 713/201 |
| 2004/0179470 | A1 * | 9/2004 | Nguyen et al. ............... | 370/216 |
| 2004/0184401 | A1 * | 9/2004 | Nguyen et al. ............... | 370/216 |
| 2005/0005031 | A1 * | 1/2005 | Gordy et al. ................. | 709/250 |
| 2005/0015667 | A1 * | 1/2005 | Aaron ......................... | 714/25 |
| 2005/0047355 | A1 * | 3/2005 | Wood et al. .................. | 370/310 |
| 2005/0076138 | A1 * | 4/2005 | Sterne ......................... | 709/238 |
| 2005/0163100 | A1 * | 7/2005 | Orava et al. .................. | 370/351 |

OTHER PUBLICATIONS

Dave Hucaby and Steve McQuerry, "Cisco Field Manual: Catalyst switch configuration", Oct. 8, 2002, Cisco Press, Section 6-6, "Private VLANs—Configuring Private Edge VLANS".*

(Continued)

*Primary Examiner*—Kimyen Vu
*Assistant Examiner*—April Y Shan
(74) *Attorney, Agent, or Firm*—Charles E. Krueger

(57) ABSTRACT

A method and apparatus for providing security to factory automation devices in a switched Ethernet network. Traffic between factory automation devices and an Ethernet switch is limited to packets including approved TCP/UDP port numbers and to selected data rates.

12 Claims, 3 Drawing Sheets

OTHER PUBLICATIONS

Montague, Jim, "Ethernet Hits Real-Time . . . Really," Control Engineering, Dec. 1, 2003, copyright 2004 Reed Business Information, a division of Reed Elsevier Inc.; retrieved from the Internet: <URL:http://www.manufacturing.net/ctl/iindex.asp?dlayout=articlePrint&articleID=CA339683>.

Mohl, Dirk S., "IEEE 1588: Running Real-Time on Ethernet," retrieved from the Internet <URL:http://ethernet.industrial-networking.com/articles/i17 real-time.asp>, Mar. 2004.

* cited by examiner

SECURE MANUFACTURING DEVICES IN A SWITCHED ETHERNET NETWORK

BACKGROUND OF THE INVENTION

Factory automation networks have traditionally utilized proprietary protocols specially designed to facilitate networking of factory automation components, for example, Human-Machine-Interface (HMI) computers, Engineering Workstations, and serial slave devices, at a manufacturing site. Because of their specialized, proprietary nature the costs of these network have remained high.

Recently, interest in using Ethernet in factory automation has grown due the inclusion of inexpensive Ethernet Network Interface Cards (NICs) on most personal computers and the low costs of commercial-off-the shelf components due to commoditization of Ethernet.

In the past, when proprietary manufacturing networks were used on the manufacturing floor no specific security measures were required because security exists due to obscurity. The only NICs available for these proprietary networks are made by specialized equipment vendors such as Rockwell and Honeywell. It would require a sophisticated user to be able to hack the network to cause harm. Since most attacks are done by non-malicious or unsophisticated attackers, there is no specific security features in place to stop attacks in these proprietary networks.

This type of security does not exist for Ethernet. Ethernet Network Interface Cards (NICs) are everywhere. A non-malicious user may plug a laptop PC into a network with Ethernet based manufacturing devices and may unknowingly spread virus or worms which can cause traffic storms. Manufacturing devices can be overwhelmed by these traffic storms thereby causing down time on the manufacturing floor.

Therefore, security measures for protecting devices on the manufacturing floor connected by Ethernet are required in the industry.

BRIEF SUMMARY OF THE INVENTION

In a first embodiment of the invention, an Ethernet switching platform protects against attacks by non-malicious or unsophisticated attackers.

In another embodiment of the invention, based on the predictable behavior of manufacturing devices through the specific protocol used, security is achieved at the switch by limiting connected nodes to only those types of traffic.

In another embodiment of the invention, protected ports are defined and the rate of traffic is limited between protected ports.

Other features and advantages of the invention will be apparent in view of the following detailed description and appended claims.

DETAILED DESCRIPTION OF THE INVENTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention. As described above, the use of Ethernet in industrial applications requires that devices on the network be protected from non-malicious security breaches such as infection by viruses and worms that could cause broadcast storms and other damaging events.

Figure 1:
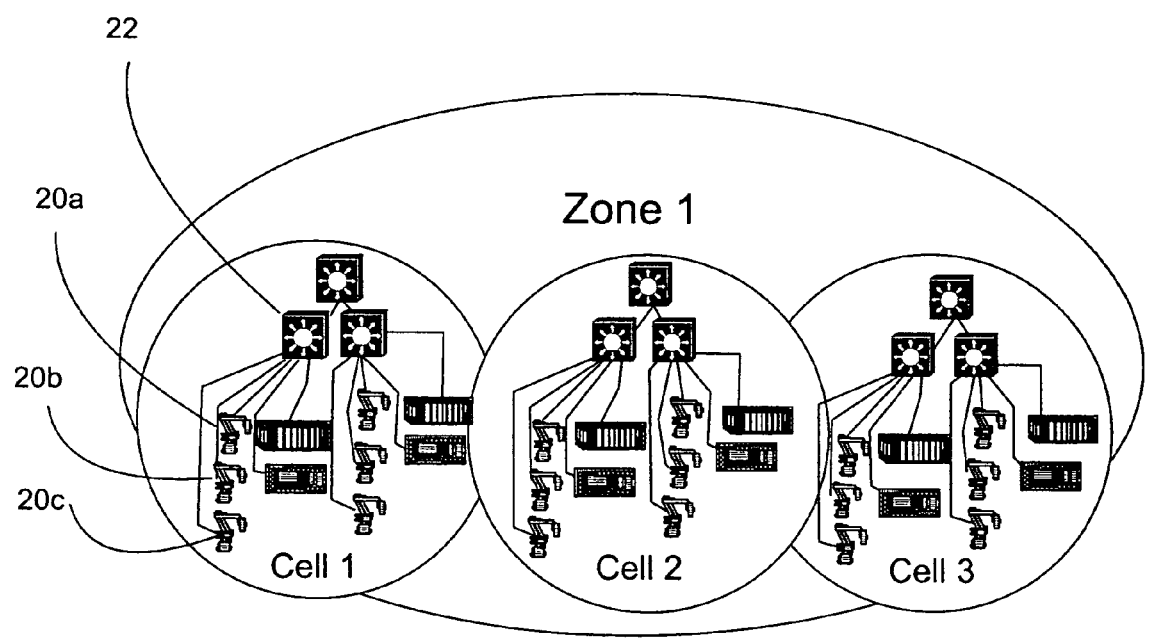
FIG. 1 is a diagram of a manufacturing floor workgroup coupled by Ethernet switches.

A first embodiment of the invention will now be described with reference to a network as depicted in FIG. 1, which depicts an example of how a factory automation network might be set up. An assembly line may contain 20-30 robotic welders 20 grouped into work groups. It may be decided that since the control equipment needs to talk to all the welders, all welders and control equipment would be assigned to the same VLAN (Virtual Local Area Network). However, in some cases where the welders may need to be managed into subgroups (i.e. frame, door panel, hood and trunk), each of these subgroups is assigned its own VLAN. The LAN utilized in the following embodiments is an Ethernet Network described in IEEE 802.3 which is hereby incorporated by reference.

In this example, three robotic welders 20a, b, and c are coupled to a first switch 22 to form a work group. The work group can also be part of a larger network.

A typical switch configuration includes a chassis, which contains basic components such as power supply, fans, slots, ports and modules that slide into the slots. The modules inserted into the slots are line cards which are the actual printed circuit boards that handle packet ingress and egress. Line cards provide one or more interfaces over which traffic flows. Thus, depending on the number of slots and interfaces, a switch can be configured to work with a variety of networking protocols. Some switches are fixed configuration switches that do not use line cards to implement interfaces.

Figure 2:
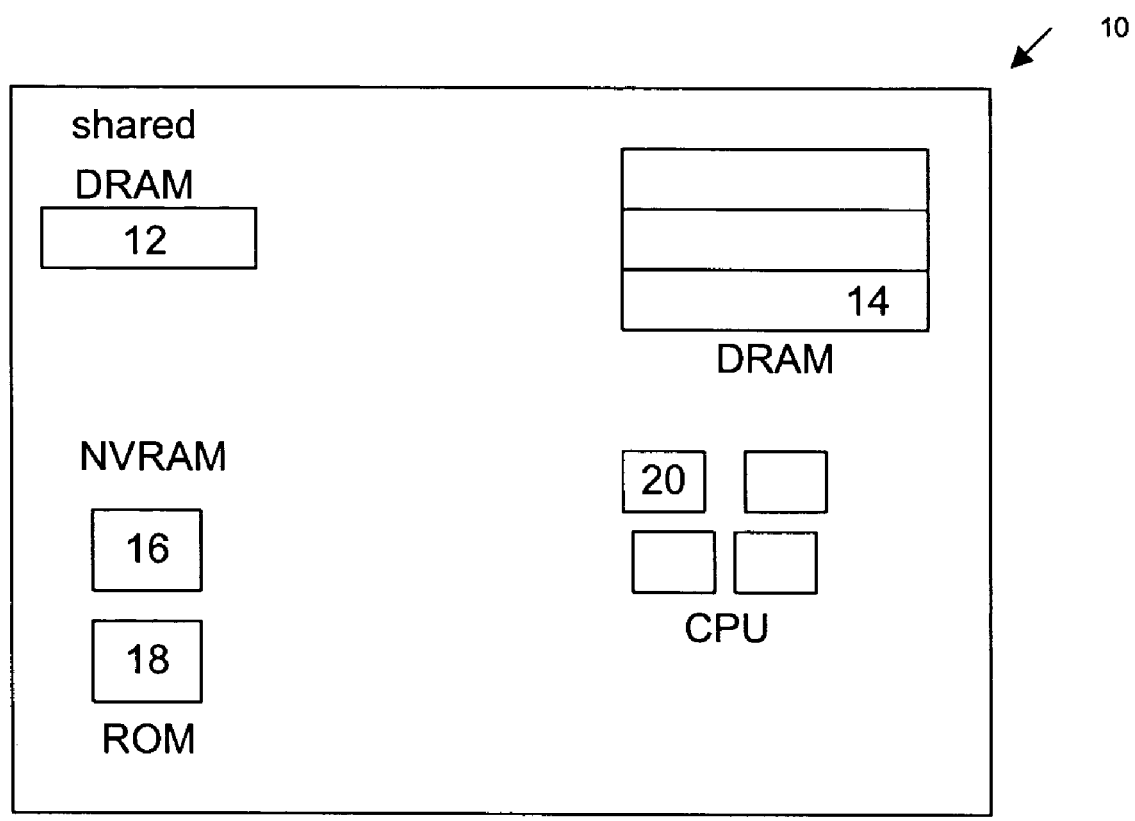
FIG. 2 is a block diagram of the motherboard of a switch.

FIG. 2 depicts an example of a switch including a motherboard 10 having shared DRAM 12, DRAM 14, NVRAM 16, ROM 18 and a CPU 20. (Other components on the motherboard not relevant to the present description are not depicted). The DRAM 14 is the working storage utilized by the CPU and the shared DRAM 12 is dedicated to handling the switch's packet buffer. The NVRAM (non-volatile RAM) is used to store the switch's configuration file and also includes flash memory for storing an image of the IOS® (Internetworking Operating System). The ROM 18 holds a boot-start program which holds a minimum configuration state needed to start the switch. Alternatively, other configurations of the motherboard can be used. For example, the motherboard may not have separate ROM or NVRAM and the configuration file and IOS® image may be stored and executed out of flash memory.

Figure 3:
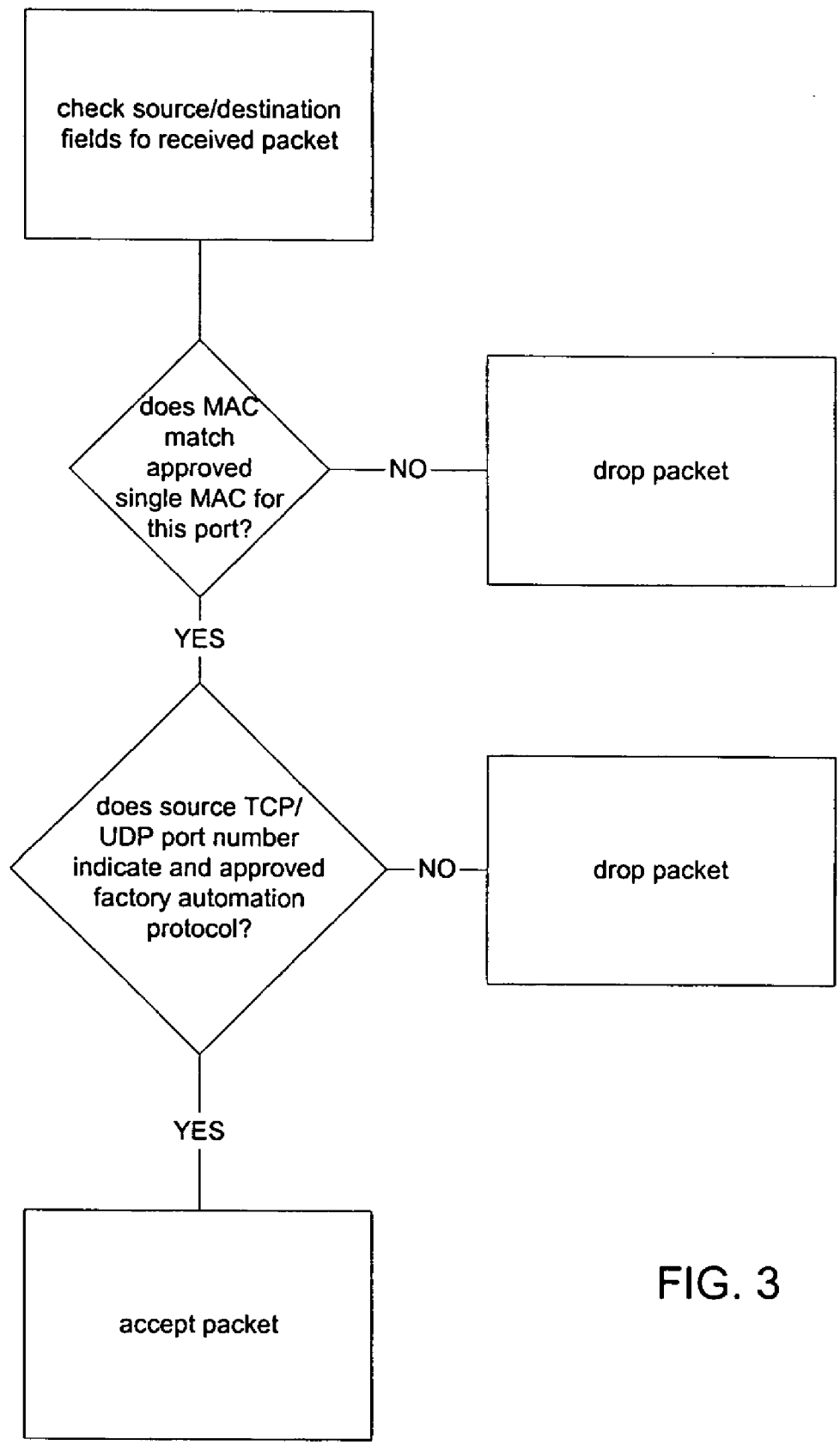
FIG. 3 is a flow chart of steps performed by an embodiment of the invention.

The operation of an embodiment of the invention will now be described with reference to the flow chart of FIG. 3. In this embodiment, each physical port of the first switch is coupled to only one device and the first switch 22 is configured to only enable a single MAC (Media Access Control) address per physical port. Thus, for example, the three robot arms 20a-c and a controller could not be attached to a hub with the hub connected to one of the physical ports of the first switch 22.

Thus, the first switch 22 can be configured to control the traffic between each device to prevent broadcast storms and other security-related problems.

In this embodiment, it is assumed the manufacturing floor is isolated properly from the corporate network and/or the Internet. Also, as described above, devices networked on the manufacturing floor tend to utilize a limited number of specialized protocols such as the Common Industrial Protocol (CIP). As is known in the art, upper layer applications that use TCP (Transmission Control Protocol) or UDP (User Datagram Protocol) are identified by a TCP/UDP port number. Packets transmitted utilizing TCP or UDP include a source and destination TCP/UDP port numbers.

For each physical port of the switch connected to a device in the workgroup only packets with TCP/UDP port numbers identifying the protocol used by the device connected are allowed ingress to the first switch 22. For example, the TCP port number for CIP for transmission by either TCP or UDP is 0xAF12 and this TCP port number is included in each packet transmitted by a connected device. The first switch is configured to ingress police each packet, and except for certain packets described below, deny access to any packet not having approved TCP/UDP source/destination TCP/UDP port numbers.

The ingress control is configured to allow access to packets having non-approved source/destination TCP/UDP port numbers that are required for correct functioning of the network, e.g., DHCP (Dynamic Host Configuration Protocol) related packets and ARP (Address Resolution Protocol) related packets, etc.

Additionally, end devices may misbehave because of attacks or bugs when CIP is utilized. To protect end devices against attacks or bugs the first switch 22 can be configured so that the data rate of approved source/destination TCP port packets is limited to a selected rate, e.g., 5000 packets per second, and the size of the packets is limited to a selected number of bytes, e.g., 128 bytes per packet. Also, the broadcast rate can be limited to a selected rate, e.g., 1 Mbps to, again, stop switches and end devices from being overwhelmed due to attacks or bugs.

In this embodiment security for uplink ports can also be implemented. In the case where all forwarding devices in the network are manufactured by the assignee of the present application, they all implement a discovery protocol (CDP). As long as the CDP neighbor cache contains fresh entries indicating a routing and/or bridging device, the port is trusted and no specific access or rate control is applied. If the CDP neighbor cache shows a different type of neighbor or no neighbor at all, and there is a link, action is taken as specified by the administrator. The Administrator should be given the choice to shut down the port and/or send notification via SNMP.

As is known in the art, switching platforms may include diagnostic physical ports which may be either active or passive. In the case of a passive diagnostic physical port the switch is configured to drop all packets received at a passive diagnostic port. For an active diagnostic physical port received traffic is policed to not exceed a selected receive data rate and broadcast storm control is enabled to limit broadcast traffic to a selected transmit data rate.

In this embodiment, administrator's have the option of configuring unused ports to be shut down, left wide open, or be left conditionally open with ingress policing for the port configured to limit port bandwidth to a selected data rate.

In one embodiment, the first switch 22 is configured to use Access Control Lists (ACLs) to limit which devices can talk to which other devices and by which protocol. By using an ACL similar to the one mentioned above for QoS, traffic patterns can be classified and explicitly permitted or denied on individual ports.

Security ACLs can also be used to limit access to a particular port or switch based on the MAC address. For example, by using a particular MAC address and a mask value, it is possible to create a filter that would allow only a specific vendor's Programmable Logic Controller (PLC) to be connected a particular port regardless of the unique MAC address on a single device. Since all Vendor's are given a certain range of MAC addresses, the first three bytes are the vendor code and can be used in this ACL.

Another feature that can be implemented in this embodiment is protected ports. Some applications require that no traffic be forwarded between access ports on the same switch so that one device does not see the traffic generated by another device. In such an environment, the use of protected ports ensures that there is no exchange of Unicast, broadcast, or multicast traffic between these access ports on the switch. A protected port does not forward any Unicast, multicast, or broacast traffic (or may forward traffic at a specified low rate) to any other port that is also a protected port. In the case where traffic cannot be forwarded between protected ports at Layer 2; all traffic passing between protected ports must be forwarded through a Layer 3 device.

The invention may be implemented as hardware or a combination of hardware and program code, stored on a computer readable medium, that is executed by a digital computer. The computer readable medium may include, among other things, magnetic media, optical media and so on.

The invention has now been described with reference to the preferred embodiments. Alternatives and substitutions will now be apparent to persons of skill in the art. For example, the above described embodiment has been described implemented in a switch it will be apparent to persons having skill in the art that other network devices, such as a router, bridge, switch, layer 2 or layer 3 switch, gateway, etc., can be utilized to implement the invention. Accordingly, it is not intended to limit the invention except as provided by the appended claims.

What is claimed is:

1. A method comprising:
controlling traffic between devices in a group of devices coupled to physical ports of an Ethernet switching platform by enabling only a single Media Access Control (MAC) address for each physical port coupled to a device in the group, wherein the group of devices is included in an assembly line that is part of a factory automation system and wherein the group of devices is assigned its own virtual local area network (VLAN);
ingress policing the physical ports on the Ethernet switching platform to allow only packets having source TCP or UDP port numbers of approved special factory automation protocols or network protocol packets to access the physical ports; and
limiting transmission and reception data rates on the physical ports of the Ethernet switching platform to selected values.

2. The method of claim 1 further comprising:
examining the first three bytes of a media access control (MAC) address included in packets sent from a device coupled to a first physical port of the Ethernet switching platform to determine the vendor of the device; and
limiting traffic received on the first physical port to a selected vendor.

3. The method of claim 1 further comprising:
designating at least two access physical ports as protected ports; and
preventing forwarding traffic between access ports on the switching platform designated as protected ports.

4. The method of claim 1 further comprising the step of:
utilizing access control lists to ingress police received packets.

5. An apparatus comprising:
means for controlling traffic between devices in a group of devices coupled to physical ports of an Ethernet switching platform by enabling only a single Media Access Control (MAC) address for each physical port coupled to a device in the group, wherein the group of devices is included in an assembly line that is part of a factory automation system and wherein the group of devices is assigned its own virtual local area network (VLAN);
means for ingress policing the physical ports on the Ethernet switching platform to allow only packets having source TCP or UDP port numbers of approved special factory automation protocols or network protocol packets to access the physical ports; and
means for limiting transmission and reception data rates on the physical ports of the Ethernet switching platform to selected values.

6. The apparatus of claim 5 further comprising:
means for examining the first three bytes of a media access control (MAC) address included in packets sent from a device coupled to a first physical port of the Ethernet switching platform to determine the vendor of the device; and
means for limiting traffic received on the first physical port to a selected vendor.

7. The apparatus of claim 5 further comprising:
means for designating at least two access physical ports as protected ports; and
means for preventing forwarding traffic between access ports on the switching platform designated as protected ports.

8. The apparatus of claim 5 further comprising:
means for utilizing access control lists to ingress police received packets.

9. One or more computer readable storage media encoded with software comprising computer executable instructions and with the software operable to:
control traffic between devices in a group of devices coupled to physical ports of an Ethernet switching platform by enabling a single Media Access Control (MAC) address for each physical port coupled to a device in the group, wherein the group of devices is included in an assembly line that is part of a factory automation system and wherein the group of devices is assigned its own virtual local area network (VLAN);
ingress police the physical ports on the Ethernet switching platform to allow only packets having source TCP or UDP port numbers of approved factory automation protocols or network protocol packets to access the physical ports; and
limit transmission and reception data rates on the physical ports to selected values.

10. The computer readable storage media of claim 9 encoded with software when executed further operable to:
examine the first three bytes of a media access control (MAC) address included in packets sent from a device coupled to a first port of the Ethernet switching platform to determine the vendor of the device; and
limit traffic received on the first port to a selected vendor.

11. The computer readable storage media of claim 9 encoded with software when executed further operable to:
designate at least two access physical ports as protected ports; and
prevent forwarding traffic between access ports on the switching platform designated as protected ports.

12. The computer readable storage media of claim 9 encoded with software when executed further operable to:
utilize access control lists to ingress police received packets.

* * * * *

UNITED STATES PATENT AND TRADEMARK OFFICE
CERTIFICATE OF CORRECTION

PATENT NO. : 7,607,166 B2  Page 1 of 1
APPLICATION NO. : 10/890500
DATED : October 20, 2009
INVENTOR(S) : Coley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1195 days.

Signed and Sealed this

Fourteenth Day of December, 2010

David J. Kappos
*Director of the United States Patent and Trademark Office*